Nov. 1, 1955     L. H. DOBKINS     2,722,575

SAFETY SWITCH FOR THE IGNITION CIRCUIT OF A MOTOR VEHICLE

Filed June 20, 1952

INVENTOR.
LAWRENCE H. DOBKINS,
BY
McMorrow, Berman + Davidson
ATTORNEYS.

United States Patent Office 2,722,575
Patented Nov. 1, 1955

2,722,575

SAFETY SWITCH FOR THE IGNITION CIRCUIT OF A MOTOR VEHICLE

Lawrence H. Dobkins, Abilene, Kans.

Application June 20, 1952, Serial No. 294,688

2 Claims. (Cl. 200—52)

This invention appertains to improvements in cutout or safety switches for the ignition circuit of a motor vehicle and especially relates to a safety device for farm vehicles, which are driven by an internal combustion engine.

It is an object of the present invention to provide a compact and simple switch, which is operatively interposed in the ignition circuit of a motor vehicle to maintain the circuit in closed condition, the switch being operative, in the event that the operator of the vehicle is accidentally dislodged from the operator's seat or falls from the tractor, to interrupt the ignition circuit and render the engine inoperative.

A further object of this invention is to provide a safety switch, which is actuated by a flexible member, the flexible member being adjustable and being connectible to the person of the operator, preferably to the operator's leg.

A further object of this invention is to provide a safety switch for the ignition circuit of a motor vehicle, the switch being dependable and efficient in operation and requiring little modification of the electrical system of the motor vehicle in installation.

These and ancillary objects and structural features of merit are attained by this invention, the preferred embodiment of which is set forth in the following description and illustrated in the accompanying drawing, wherein.

Figure 1:
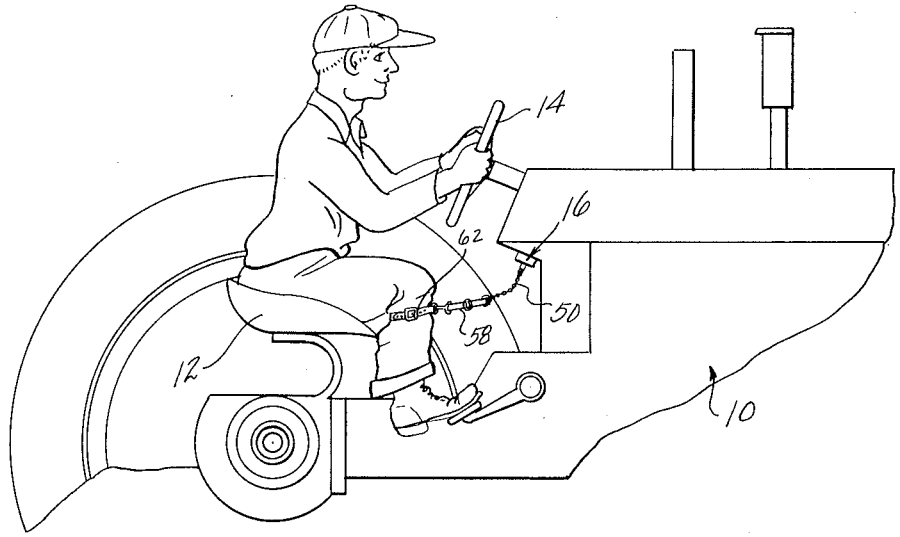
Figure 1 is a fragmentary elevational view of a tractor, equipped with a safety switch, constructed in accordance with the principles of this invention and illustrating the switch operatively installed on a vehicle.
Figure 2:
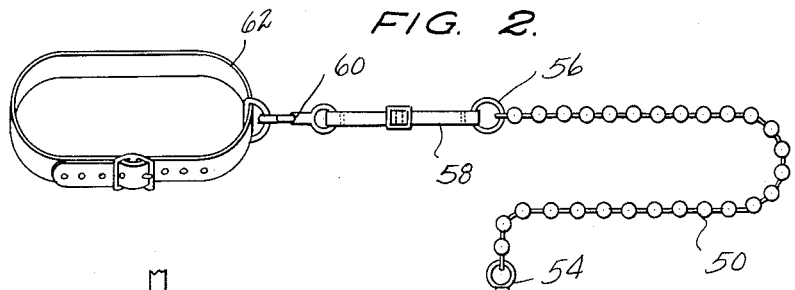
Figure 2 is a view in perspective of the safety switch.
Figure 3:
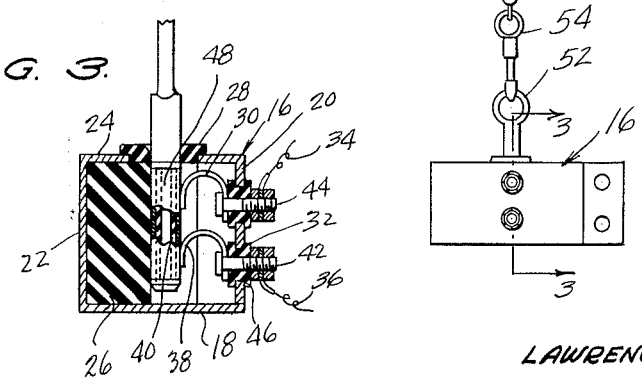
Figure 3 is a sectional view taken on line 3—3 of Figure 2.

With continued reference to the accompanying drawing, a conventional tractor 10 is illustrated for exemplary purposes, the same being provided with an operator's seat 12, disposed adjacent to the steering wheel 14 and being driven by an internal combustion engine (not shown). The tractor is conventionally provided with an electrically operated ignition means and a source of electrical energy, such as a battery, and electric circuit in which the battery and ignition means are operatively interposed.

It is a primary aim of this invention to provide a safety or cutout switch for the ignition circuit, whereby the ignition circuit is interrupted, when the operator is accidentally dislodged from the seat 12 or from a position, adjacent to the seat and steering wheel 14. Thus, in the event that the operator should become physically disabled or should fall asleep, which conditions would normally lead to a fall by the operator from the seat zone, the ignition circuit will be immediately and effectively interrupted, so that the engine will be rendered inoperative and the tractor will be rendered immobile. This will obviate the possibility of the operator being injured by the moving tractor or by the farm machinery, drafted by the tractor.

The safety switch 16 includes a casing 18, which is preferably mounted adjacent to the dashboard and which is formed with opposing side walls 20, 22 and a front wall 24. A block of insulated material 26 is positioned in the casing alongside of the side wall 22 and an insulated opening 28 is formed in the front wall 24, adjacent to the inner side of the insulated block.

A pair of fixed contacts 30 and 32 are interposed in the electric circuit, in which the battery and ignition means are interposed, by leads 34 and 36. The contacts 30 and 32 are preferably U-shaped, having inner legs 38 and 40, which are in opposed confronting relation to the inner side wall of the insulated block. The contacts are disposed in spaced side by side relationship and are secured by fastening members 42 and 44 to the side wall 20 of the casing, the fastening members being disposed through insulating bushings 46.

A movable contact 48 is positioned through the insulated opening 28 in the front wall and is axially movable therethrough, the inner conducting end of the contact being bridgingly engageable with the legs 38 and 40 of the fixed contacts, so as to connect the contacts together and normally maintain the circuit in a closed condition.

A flexible element 50 is provided for connecting the movable contact to an operator, the movable contact terminating at its outer end in a ring 52, which receives, by means of a connector 54, one end of the flexible connecting element. The opposing end of the connecting element terminates in a large ring 56, which receives an adjustable strap 58. The strap 58 is connected by a releasable link 60 to a strap 62, which is adapted to be fixedly circumposed on the leg of an operator, as seen in Figure 1. Of course, the strap 62 may be large enough to encircle the waist of an operator or may be formed with the necessary adjuncts to be easily attached to any other part of the operator, depending upon the desire of the operator and the type of driven vehicle.

In use, the movable contact is normally in bridging engagement of the fixed contacts for retaining the electric circuit in a closed condition. However, should the operator be accidentally dislodged from the seat or a position, adjacent to the seat, the flexible element will be stretched taut and the movable contact will respond to the condition of the flexible element in sliding outwardly from the casing. The outward movement of the movable contact will open the electrical circuit and the ignition circuit will be interrupted, so that the internal combustion engine will be rendered inoperative, thus rendering the tractor or similar vehicle immobile.

Having thus described the invention, what is claimed is:

1. A switch for interrupting the flow of electrical energy through the ignition system of the power plant of a farm tractor, said switch comprising a housing adapted to be secured to a farm tractor in the vicinity of the operator's station on the tractor, spaced arcuate contact springs carried by the housing in electrically isolated relation thereto, an insulator carried by the housing and extending thereinto toward the springs, and a conducting plug adapted to be introduced into the housing between the insulator and the springs to establish electrical communication between the springs.

2. A switch for interrupting the flow of electrical energy through the ignition system of the power plant of a farm tractor, said switch comprising a housing adapted to be secured to a farm tractor in the vicinity of the operator's station on the tractor, spaced arcuate contact springs carried by the housing in electrically isolated relation thereto, an insulator carried by the housing and extending thereinto toward the springs, a grommet of insulating material carried by the housing and aligning axially with the space between the insulator and the springs, a plug of conducting material adapted to be entered into the casing through the grommet and extending into the space between the insulator and the springs for establishing electrical communication between the springs, and an eye carried by the plug in electrically isolated relation therewith and projecting through the grommet for connection to the person of an operator of the farm tractor.

References Cited in the file of this patent

UNITED STATES PATENTS 1,988,330   Pettersonn _____ Jan. 15, 1935